Jan. 10, 1961    O. DAHLE    2,967,426
FORCE MEASURING DEVICE
Filed Sept. 9, 1957
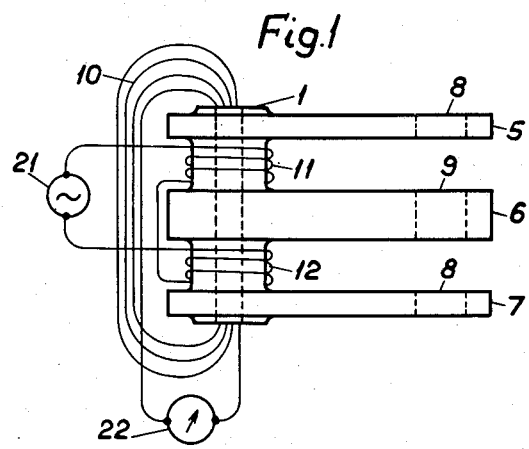
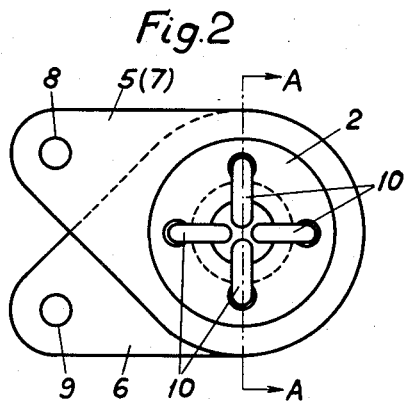
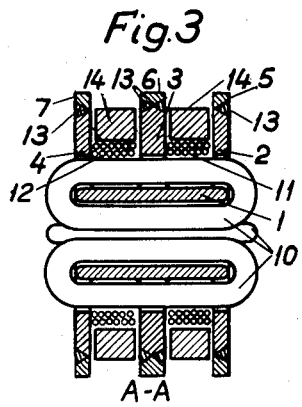
Inventor
Orvar Dahle
By [signature]
Attorney.

United States Patent Office 2,967,426
Patented Jan. 10, 1961

2,967,426

FORCE MEASURING DEVICE

Orvar Dahle, Vasteras, Sweden, assignor to Allmänna Svenska Elektriska Aktiebolaget, Vasteras, Sweden, a corporation of Sweden Filed Sept. 9, 1957, Ser. No. 682,955

Claims priority, application Sweden September 15, 1956

2 Claims. (Cl. 73—141)

This invention relates to improvements in force measuring devices of the kind utilizing the magnetostrictive properties of certain ferromagnetic materials.

It is known that torsional stress of a hollow shaft can be measured electromagnetically by magnetizing the shaft circularly with a winding which is threaded through and linked with said hollow shaft and by measuring by means of another winding wound around said shaft the axial component of flux which arises in magnetostrictive materials in consequence of torsional stress. This phenomenon is called the first inverse Wiedemann effect. There is also a second inverse Wiedemann effect, which implies that an axial magnetization gives rise to a circular flux when a shaft is subjected to torsion. This can be utilized for measuring torsional stress and is in many cases more practicable than the first inverse Wiedeman effect.

Both inverse Wiedemann effects can also be utilized for measuring forces if the hollow shaft is fitted with levers on which the forces can act. It would be natural to apply the levers of such a force measuring device to the hollow shaft by welding. This, however, gives rise to considerable welding stresses. Owing to the magnetostriction not only in the hollow shaft but also in the weld and the levers these welding stresses give rise to a deformation of the magnetic field of the measuring device, so that the proportionality between the instrument reading and the force to be measured vanishes. It has been shown by experiments that the proportionality is not much improved by normalizing the body of the device.

It is an object of the invention to provide a force measuring device of the kind described in which a substantial proportionality exists between the force to be measured and the voltage induced in the measuring coil.

It is a further object of the invention to provide a force measuring device of the kind described in which the welding stresses arising from the attachment of the levers to the measuring body do not influence the measurement.

According to the invention the shaft in which the Wiedemann effects are utilized for force measurement is provided with flanges to which the levers are attached, which flanges are made in one piece with said shaft, for instance, by turning, so that the shaft and the flanges form a bobbin-shaped member of substantially homogeneous material.

The invention is described in the following with reference to the accompanying drawing in which Fig. 1 schematically shows a force measuring device of the type in question, Fig. 2 shows a side view of a force measuring device according to the invention and Fig. 3 shows a section A—A of the device according to Fig. 2.

In the arrangement according to Fig. 1, 1 is a hollow shaft or a substantially tubular member provided with levers 5, 6, 7 having drillings 8, 9 at which a force can act. For example the shown force measuring device may be attached between the hook and the wires of a hoist, by fixing the wires to the drillings 8 and the hook to the drilling 9. Between the levers 5 and 6, 6 and 7 respectively there are two windings 11 and 12 which are connected in series to an alternating current source 21. A winding 10 connected to an electrical measuring means 22 is threaded through and linked with the hollow shaft.

Owing to the alternating current in the windings 11 and 12, axial magnetomotive forces appear in those parts of the hollow shaft 1 which lie between the levers 5 and 6, 6 and 7 respectively. If the hollow shaft 1 is magnetically isotropic, the magnetic field will be axial and no electromotive force is induced in the winding 10 which is assumed to be in a radial plane. Loading of the levers 5, 6, 7 with forces perpendicular to the plane of the drawing induces torsional stress in the shaft and in consequence magnetic anisotropy which causes the flux to assume a helical path and thus to induce an electromotive force in the winding 10. This electromotive force drives a current through the instrument 22. As the torsional stresses in the two loaded parts of the hollow shaft 1 have opposite directions when the force acts at the drilling 9, the winds 11 and 12 have to be connected in opposition, as shown in Fig. 1, so that the effect of both active parts will be added in the output circuit.

Usually the hollow shaft 1 is of iron which has magnetostrictive properties and in these cases the change of direction of the magnetic flux is due to the increase and decrease respectively of the permeability of the iron in the direction of the two principal stresses into which the torsional stress can be resolved. The direction of the magnetic flux can also be changed when the hollow shaft 1 is of non-magnetic material as the resistivity of the material is dependent on the mechanical stresses (elastoresistive effect) so that the eddy-current pattern is deformed. However, this effect is very unpronounced and is at present of no significance compared with the magnetostrictive effect.

The above described ideal conditions are disturbed by every mechanical stress in the magnetized material. This is why the welding stresses due to the application of the levers 5, 6, 7 give rise to a considerable zero-deflection on the instrument 22 when the levers are not loaded. This zero-deflection is, however, avoided in the embodiment of the force measuring device shown in Figs. 2 and 3.

In the force measuring device shown in the Figs. 2 and 3 the levers 5, 6, 7 are not welded directly to the hollow shaft 1, but to flanges 2, 3, 4 respectively, which are made in one piece with the hollow shaft 1. These flanges 2, 3, 4 have four drillings each through which the winding 10 is threaded. In this way the winding 10 is divided into four symmetricaly arranged coils which link the hollow shaft 1, essentially as a toroid winding. The windings 11 and 12 totally enclose the winding 10 and are surrounded by rings 14 of magnetic material, which rings close the magnetic path of the windings 11 and 12.

Welds 13 between the levers 5, 6, 7 and flanges 2, 3, 4 cause magnetic anisotropies also in the device shown in Figs. 2 and 3, the influence of these anisotropies on the reading of the instrument 22 is negligible, however, as the winding 10 does not, in this case, enclose any part of the magnetically anisotropic material.

As the stray flux of the windings 11 and 12 is effectively limited by the rings 14, the welds 13 can easily be shielded from the magnetic field by making the diameter of the flanges 2, 3, 4 so great that the rings 14 are inside the periphery of said flanges 2, 3, 4. As the welds are shielded from the magnetic field the welding stresses have, of course, no influence on the result of the measurement even if the welds were enclosed by the winding 10, this is why a zero-reading of the measuring instrument 22 can be avoided merely by means of the flanges 2, 3, 4 without providing drillings for the winding 10.

The disadvantages caused by the welds can thus be avoided in two different ways, as described above, when the hollow shaft 1 is made in one piece with the flanges 2, 3, 4 which results in a bobbin-shaped member of homogeneous stress free material to which the levers 5, 6, 7 are attached. The best result is of course achieved by combining both described measures.

I claim as my invention:

1. A force measuring device comprising a shaft having an axial hole therethrough, flanges integral with said shaft, said shaft and said flanges forming a substantially bobbin-shaped member of substantially homogeneous magnetostrictive material, said flanges having holes therein extending in the longitudinal direction of said shaft, at least one first coil wound on said bobbin-shaped member, at least one second coil threaded through said axial hole in said shaft and back through said holes in said flanges, a source of alternating current connected to one of said coils, whereby a magnetic field is created in said bobbin-shaped member, a voltage responsive measuring means connected to the other of said coils, levers attached to the periphery of said flanges and adapted to be influenced by the forces to be measured in such a way that torsional stresses arise in said bobbin-shaped member, the points of attachments of said levers to said flanges lying substantially outside the path of the magnetic flux linked by said coil connected to said measuring means.

2. A force measuring device as claimed in claim 1, comprising a ring of magnetic material surrounding said first coil, said flanges having a larger diameter than at least the inner diameter of said ring.

References Cited in the file of this patent

UNITED STATES PATENTS

| 2,445,427 | Godsey | July 20, 1948 |
| 2,511,178 | Roters | June 13, 1950 |

FOREIGN PATENTS

| 722,915 | Germany | July 24, 1942 |
| 778,024 | Great Britain | July 3, 1957 |

OTHER REFERENCES

A publication entitled "Application of the Inverse Weidemann Effect to Torque Measurements and to Torque Variation Readings," by Tatuo Kobayasi, Art. No. 52 Deports of Aeronautical Institute of Tokio University, November 1929, pp. 425–445.